Figure 3:
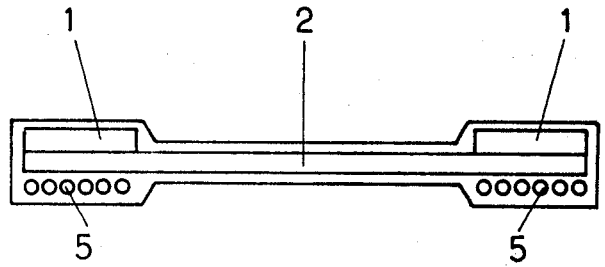

United States Patent [19]
Joug et al.

[11] 3,739,203
[45] June 12, 1973

[54] LINEAR INDUCTION MOTOR ARMATURES

[75] Inventors: Roland Joug, Nohanent; Bernard Ragout, Clermont-Ferrand, both of France

[73] Assignee: Pneumatiques, Caoutchouc Manufacture et Plastiques Kleber-Colombes, Colombes, France

[22] Filed: Nov. 12, 1971

[21] Appl. No.: 198,322

Related U.S. Application Data

[63] Continuation of Ser. No. 52,415, July 6, 1970, abandoned.

[52] U.S. Cl. ................................ 310/13
[51] Int. Cl. ............................ H02k 41/02
[58] Field of Search ................... 310/12–14

[56] References Cited
UNITED STATES PATENTS
3,308,312  3/1967  Ehrenberg ..................... 310/13
1,754,685  4/1930  Kanter ........................... 310/13

*Primary Examiner*—D. F. Duggan
*Attorney*—Holcombe, Wetherill & Brisebois

[57] ABSTRACT

This invention relates to electrical armatures and according to the invention an armature, constituting a transport or conveying member adapted to be driven by the inductors of linear motors, is in the form of a squirrel cage made up of two flexible longitudinal members interconnected by transverse members. These transverse members are spaced apart by a distance of up to but not exceeding half the motor pole pitch and support members extend over the entire length of the armature and are less extensible than it. Finally, the armature and the support members are embedded in a flexible material such as natural or synthetic rubber or a synthetic plastics substitute therefor.

9 Claims, 6 Drawing Figures

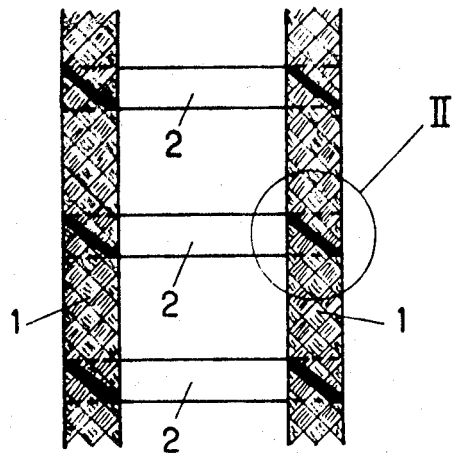
Fig 1
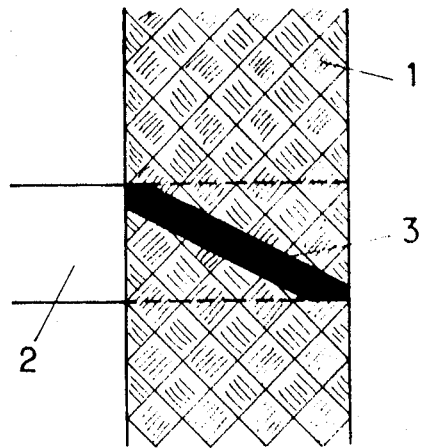
Fig 2
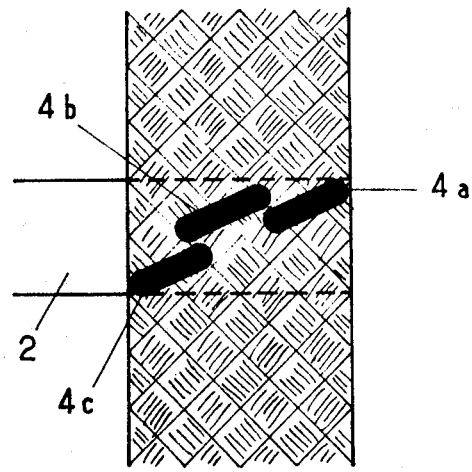
Fig 2 bis

Patented June 12, 1973 3,739,203

2 Sheets-Sheet 2

LINEAR INDUCTION MOTOR ARMATURES

This is a continuation, of application Ser. No. 52,415, filed July 6, 1970.

The invention relates to members for use in transporting loads which members constitute armatures intended to be driven in a non-reciprocating means for linear electric induction motors.

The transport or conveying members according to the invention can be used singly to support and transport or transfer loads. They also may be used simply to drive these loads which are supported by other means: for example, they may be incorporated in or connected to a conveyor belt forming part of a conveyor or they may even drive loads carried by a rail on which they roll or slide.

Transport or conveying members are already known which are armatures for linear electric induction motors.

For example, it has been proposed to drive by means of inductors of linear motors, sheets or metal materials supporting loads. However, amongst others, this solution has two major drawbacks: the electrical efficiency is poor and the sheets or metal materials do not have the necessary suppleness to be able to be coiled or rolled about small diameters — which is necessary when they have to form a continuous strip or be able to assume curves having a small radius of curvature.

Armatures for linear motors have therefore been described which are in the form of a developed squirrel cage and which are flexible. Armatures of these types which, moreover, can be located between two thin layers of a flexible insulating material and which may comprise magnetic particles to improve the permeability of the air gap, are used to drive objects as light as the pointer of a recorder device, but they cannot be used to drive appreciable loads on the one hand, because their efficiency is not necessarily good and, on the other hand, because they deteriorate rapidly which causes a drop in efficiency which rapidly becomes very poor.

The invention has for an object a transport conveying member which is also an armature for a linear motor but which, in its capacity as an armature, has an excellent electrical efficiency and which, in addition, is perfectly adapted to drive the loads.

The transport conveying members according to the invention comprise simultaneously:

a. an electrical part, hereinafter referred to as electrical armature, in the form of a developed ladder or squirrel cage, the two longitudinal parts of which are flexible and preferably formed from wire braids made from a material which is a good conductor of electricity and non-magnetic or slightly magnetic and whose transverse parts (the bars) are fixed to the longitudinal parts in such a way that there exists, therebetween, electrical continuity as good as possible, and are spaced at a distance at least equal to the half the pole pitch of the inductors, i.e. a distance equal to or less than half of that, which in the inductors, separate two consecutive North or South poles at a given time.

b. support members extending at least over the entire length of the electrical armature, whose elongation is, in all cases, less than that of the electrical part whatever the mechanical stresses to which the transport or conveying member according to the invention is subjected.

c. a layer of rubber or another flexible material in which the electrical armature and the mechanical stress armature are embedded.

Figure 4:
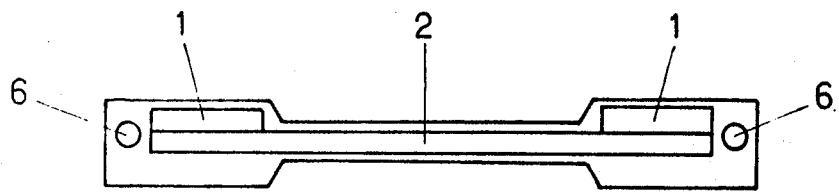
Figure 5:
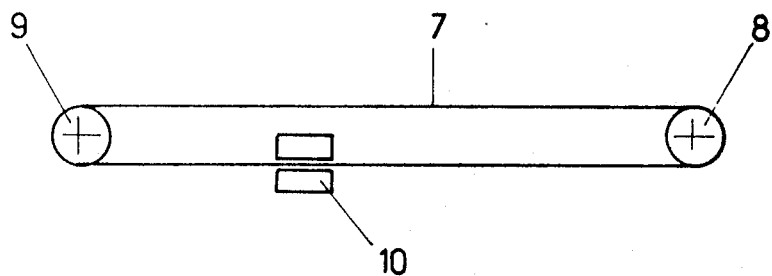

In order that the invention may be more clearly understood, reference will now be made to the accompanying drawings which diagrammatically show some embodiments thereof, purely by way of example, and in which:

FIG. 1 shows a plan view of an electrical armature of a transport or conveying member according to the invention, FIG. 2 shows a detailed view of the area II of FIG. 1 showing the detail of the assembly of the longitudinal braids on the bars, FIG. 2a shows a detail view of another assembly of the braids on the bars, FIG. 3 shows a cross-section through a transport or conveying member according to the invention, FIG. 4 shows a cross-section through another embodiment of transport or conveying member according to the invention, and FIG. 5 shows an experimental or testing device.

Referring now to the drawings, there is shown an electrical armature formed from two longitudinal braids 1 made from fine wire, the diameter of which is substantially between 0.03 and 0.15 mm, and made from a material which is a good conductor of electricity and non-magnetic or only slightly magnetic, such as for example, copper, aluminium or phosphor-bronze.

It has been noted that in use, braids have many advantages over cables or strands, more particularly, for a similar useful conductive section, that of better flexibility and that of longer life.

In the embodiments shown in FIGS. 1 and 2, the braids have a rectangular section of 18 × 2 mm, the corresponding useful section being 18 mm², and they are formed by braiding bundles of copper wires having a diameter of 0.08 mm; the distance separating the axes of the braids 1 is 112 mm.

These braids 1 are interconnected by transverse parts 2 which form the bars of the ladder or the squirrel cage; these bars 2 are made from a material having low electrical resistivity and non-magnetic or only slightly magnetic, such as aluminium, copper or phosphor-bronze.

According to the application for which the transport or conveying member is intended, and therefore, according to the transverse suppleness which it is desired to impart thereto, these bars 2 are either flat bars or they may be braids, but it is important that they be connected to the longitudinal parts 1 so that the electrical continuity is as good as possible and, in the case where the member is intended to assume curves of small radius, so that this join does not have the effect of longitudinally stiffening the parts 1 over too large an area.

Moreover, in order to be certain of having good electrical continuity, the bars 2 have been welded, brazed or soldered to the parts 1, but if the whole of the area of contact between the bars 2 and longitudinal braids 1 is so secured, the braids become very stiff over large areas; moreover, for certain uses in which the member has to pass several times around pulleys of very small diameters, this stiffness is unacceptable for it very rapidly causes deterioration of the armature as a whole.

If, on the other hand, the bars 2 are welded, brazed or soldered to the longitudinal braids 1 at points regularly distributed over the entire area of superposition, satisfactory suppleness is obtained but there is a decrease in the electrical efficiency which doubtless contributes to the fact that the electrical continuity is not perfect, all the strands or ribbons of wire forming the braids not being directly and permanently connected to the bars 2.

The embodiment shown in FIGS. 1, 2 and 2a, allows this problem to be solved: in this embodiment, the bars 2 and the longitudinal braids 1 are assembled by one or more welds, etc. in an area extending diagonally with respect to the area of superposition. In the case of FIG. 2, a single weld 3 covers this area and in the case of FIG. 2a, three welds 4a, 4b, 4c have been made which are separate but juxtaposed and offset so as to be included in any transverse or longitudinal section of the area of contact between the bars 2 and the longitudinal parts 1. Preferably the size of these welds is at least equal to the thickness of the braids forming the longitudinal parts 1.

It has been proved that with such assemblies the electrical efficiency is good and that the transport or conveying member can pass several times around small diameters without diminishing the efficiency, which shows that the armature remains intact. This is quite surprising for the existence, on both sides of the weld area, of parts which are not fixed ought to have lead to the appearance of tears as the member passes over such small diameters.

The distance between the bars is never less than half the pole pitch of the inductors, and preferably the bars are the only parts of the electrical armature subjected to magnetic flux. In the embodiment, the bars 2 are subjected to these magnetic fields only in their central part over approximately three-quarters of their length.

In order that the member according to the embodiment has a good transverse suppleness, the bars 2 are advantageously made from braids formed from the same kinds of wire as those used for the braids 1, and whose section is a rectangle 12mm × 2 mm in size, the useful section being 12 mm². Where the pole pitch of the inductors is 100 mm, the axes of the bars 2 are 40 mm apart, namely 0.40 times the pole pitch and the assembly of the bars 2 on the longitudinal parts is done by electric welds arranged as shown in FIG. 2.

When the member is in use, i.e. when the armature is subjected to the action of the sliding magnetic fields created by the inductors, stresses, which cause displacement of the member, arise on the transverse bars 2 which are the parts of the member subjected to the magnetic flux. These stresses are always relatively slight and in all cases sufficiently small so that the armature, embedded in rubber, can support them.

However, it has been shown that where such a member is formed only from an electrical armature embedded in rubber, the output decreases at the end of a certain time of use even if the mechanical resistance of the electrical armature is theoretically sufficient to withstand the stresses to which it is subjected; examination reveals that the electrical armature has become deformed and that these deformations have caused fractures at certain places.

On the contrary, if members which extend at least over the entire length of the armature and whose elongation is less are associated therewith, it is shown that the efficiency of the traction member in service remains practically constant. These members, which have to be less extensible than the armature, act to oppose the extension of the latter; for this reason they are referred to as support elements.

Preferably, these elements are filaments or wires, which may be stranded or cabled, made from a material of slight extensibility, but there may also be used woven fabrics provided always that they be less extensible than the armature. In the transport or conveying member, they are positioned in such a manner that their assembly enters the same plane of longitudinal symmetry as the armature. On the one hand, in order to avoid increasing the thickness of the air gap at the place of the bars 2 which are the parts of the electrical armature exposed to the magnetic flux, and on the other hand, because it is the longitudinal braids 1 which have the greater tendency to stretch, they are preferably only located adjacent these latter.

In the embodiment of transport or conveying member shown diagrammatically in cross-section in FIG. 3, these support members are cables 5 of glass wires having a diameter of 0.8 mm and arranged in two layers situated below the longitudinal braids 1; the assembly of these two layers is symmetrically disposed plane-wise about the axis of the armature.

In another embodiment, shown in cross-section in FIG. 4, the transport or conveying member comprises the same electrical armature as hereinabove. The support members comprise two longitudinal cables 6 positioned at the edge of the longitudinal braids 1. This latter embodiment has the advantage over the previous one, of stiffening the member less in the longitudinal direction and of allowing it to coil in any direction whatsoever.

If, as in the embodiment where only the bars are subjected to the action of the magnetic fields, the support members are positioned outside the area subjected to the magnetic fields, they can be made from any material whatsoever, magnetic or not. If, on the other hand, they are positioned in an area subjected to magnetic fields, they must be made from a non-magnetic material, which excludes metals, such as steel.

The armature and the support members are embedded in rubber or similar flexible material which protects both the outer extents and ensures the distribution and transmission of the stresses. The rubber may be natural or synthetic or the flexible material could be any one of the well-known flexible, pliable plastics materials which may, if found desirable, be of a porous nature.

As is shown in FIGS. 3 and 4, the mass of rubber in which the armature and the support members are embedded, has in its central part at the place of the bars 2, an area of less thickness; in the embodiment, the layers of rubber situated above and below the bars are 0.5 mm in thickness. This small layer thickness is sufficient to protect the bars 2 and does not have the effect of increasing the air gap to such an extent that the efficiency is appreciably diminished.

In addition, the magnetic permeability of the rubber parts exposed to the magnetic fields can be increased by loading them with magnetically weak ferrites; expressed in weight, the proportion of ferrites with respect to the rubber can easily reach 6 or 8 to 1 since, in this case, the rubber is primarily a supple binder between the ferrites.

FIG. 5 shows diagrammatically a test rig on which different transport or conveying members have been tested. The members here indicated at 7, are mounted in continuous fashion about two pulleys 8 and 9 whose axes are parallel and whose diameter is 150 mm. One of these pulleys is braked so that the driving thrust is 12 DaN.

The members are driven under the effect of the inductors of two linear motors 10 having a double yoke of 100 mm pole pitch, the distance between the yokes and the members being approximately 1 mm; the drive speed is 4 m/sec. namely a speed equal to 80 percent of the synchronous speed, conditions under which the thrust of the motors is 12 DaH. From the commencement and at the end of 1 million, 2 million, 5 million and 7 million cycles, the defined efficiency was measured as the ratio between the mechanical power collected and the electrical power supplied by the inductors to the armature, i.e. to the transport or conveying member.

In all the members tested, the armature was formed from two longitudinal braids and bars identical to those of the embodiments described and all the members have, in cross-section, the shape of a dumb-bell shown in FIGS. 3 and 4.

Test Member No. 1 did not have any support members and the bars were separated from each other by 0.4 times the pole pitch, the members being assembled with the longitudinal braids by means of electric welds carried out as shown in FIG. 2.

Test Member No. 2 had support members and was in accordance with the embodiment of FIG. 3 but the welds assembling the bars to the longitudinal braids was effected over the entire area of contact.

Test Member No. 3 was identical to the preceding one but the bars were assembled to the longitudinal braids by means of welds effected at five points distributed over the area of contact.

Test Member No. 4 was identical to the preceding one but the welds were arranged in the manner shown in FIG. 2.

Test Member No. 5 was identical to the preceding one with the exception that the support members were as shown in FIG. 4.

Test Member No. 6 was identical to Test Member No. 4 but the bars were 60 mm apart, namely 0.6 times the pole pitch.

Test Member No. 7 was identical to Test Member No. 4 but the bars were 80 mm apart, namely 0.8 times the pole pitch.

The following table summarises the results of these tests:

| Test Member No. | $1_{(a)}$ | $2_{(b)}$ | $3_{(c)}$ | 4 | 5 | $6_{(d)}$ | $7_{(e)}$ |
|---|---|---|---|---|---|---|---|
| Initial output | 0.77 | 0.77 | 0.67 | 0.77 | 0.77 | 0.65 | 0.43 |
| After 1 million cycles | 0.63 | 0.75 | 0.65 | 0.77 | 0.77 | | |
| After 2 million cycles | 0.3 | 0.69 | 0.63 | 0.75 | 0.75 | | |
| After 5 million cycles | | 0.45 | 0.58 | 0.72 | 0.73 | | |
| After 7 million cycles | | | | 0.69 | 0.70 | | | a. the test had to be interrupted at this instant, the temperature of the member increasing following rapid decrease in output;
b. the test had to be interrupted before 7 million cycles had been reached, the temperature increasing rapidly which denoted a rapid drop in output;
c. it was not estimated to be advantageous to pursue the test beyond 5 million cycles.
d. and e. the weakness of the outputs justified stopping the tests.

These tests clearly show the necessity for the provision of the support members and that of not spacing the bars at a distance greater than half the pole pitch and they also show the importance of the shape of the welds assembling the longitudinal braids to the bars.

We claim:

1. A member for use in transporting loads, which member is intended to be driven in a non-reciprocating manner by the inductors of electric linear motors, which inductors provide poles spaced apart by a given pitch, said member comprising an electrical armature in the form of a developed squirrel cage formed from two supple longitudinal parts connected by transverse parts and wherein said transverse parts are spaced from one another by a distance not in excess of half the pole pitch of said inductors of the linear motors, longitudinally extending support members extending over the entire length of the armature and offering greater resistance to extension than said armature, said armature and said members support being embedded in a flexible material.

2. A transport or conveying member according to claim 10, wherein said longitudinal parts of said armature are constituted by wire braids.

3. A member according to claim 2, wherein said longitudinal braids and said transverse parts of said armature are assembled by welds made along a diagonal line in the zones where they are in contact.

4. A member according to claim 1, wherein said support members are constituted from wires.

5. A member according to claim 4, wherein said wires are stranded together.

6. A member according to claim 4, wherein said wires are cabled.

7. A member according to claim 1, wherein said support members are distributed in two groups each positioned to one side of the central longitudinal plane of said armature.

8. A member according to claim 1, wherein said support members are distributed in two groups each on the other longitudinal edge of said armature.

9. A member according to claim 1, wherein the central area of said armature corresponding to the position of said transverse parts, is thinner than the lateral areas thereof.

* * * * *